United States Patent [19]
Taha

[11] Patent Number: 6,019,129
[45] Date of Patent: Feb. 1, 2000

[54] VALVE POSITION ADJUSTABLE LOCK MECHANISM

[75] Inventor: Sami Taha, Plattsburgh, N.Y.

[73] Assignee: Preso Meters Corp., Plattsburgh, N.Y.

[21] Appl. No.: 09/158,534

[22] Filed: Sep. 22, 1998

[51] Int. Cl.[7] .................................................. E03B 7/07
[52] U.S. Cl. ...................... 137/553; 137/556; 137/556.3; 251/285; 251/288
[58] Field of Search ................... 137/553, 556, 137/556.3, 556.6; 251/285, 288

[56] References Cited

U.S. PATENT DOCUMENTS

| | | | |
|---|---|---|---|
| 1,054,623 | 2/1913 | Schreidt | 137/556.6 |
| 1,283,752 | 11/1918 | Haynes | 137/556.6 |
| 2,247,090 | 6/1941 | Jones et al. | 137/556.6 |
| 4,813,455 | 3/1989 | Iqbal | 251/288 |

*Primary Examiner*—Henry J. Recla
*Assistant Examiner*—Timothy L. Maust
*Attorney, Agent, or Firm*—Swabey Ogilvy Renault; Guy J. Houle

[57] ABSTRACT

A valve position adjustable lock mechanism is secured to the handle which is connected to the stem of a valve element to control the position of the valve element and accordingly the size of the opening of the valve element. An indicator ring is secured to the handle and is provided with position indicias thereon to indicate the position of the valve element from a fully open to a fully closed position. An arresting projection arrests the handle at the fully open and fully closed positions. A stopper ring is disposed over the indicator ring and displaceable for engagement and disengagement therewith. The stopper ring has an abutment flange for abutment with a fixed stop element secured to the valve body. The stopper ring has an alignment window to position the abutment means at a desired location selected by the position of the alignment window relative to the position indicias on the indicator ring.

13 Claims, 5 Drawing Sheets

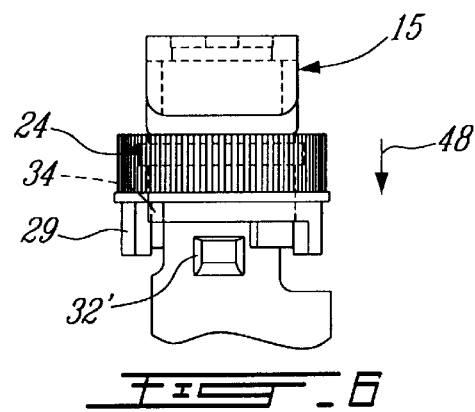
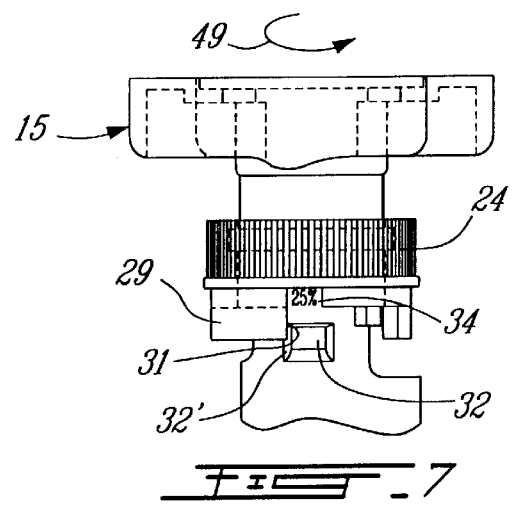
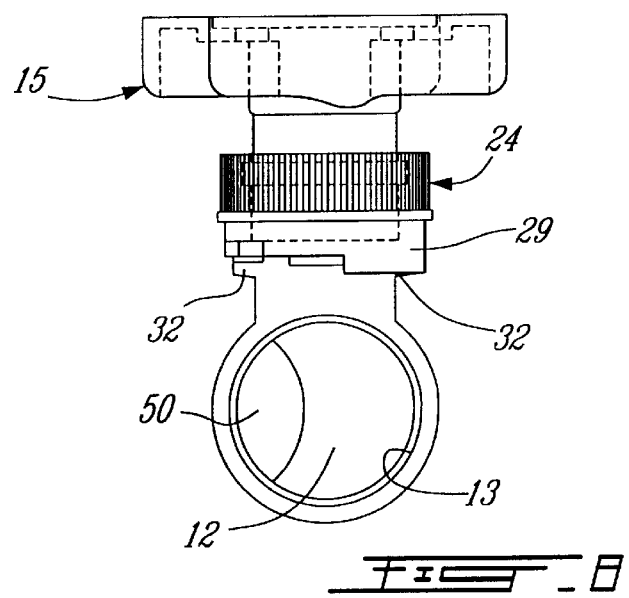

6,019,129

VALVE POSITION ADJUSTABLE LOCK MECHANISM

TECHNICAL FIELD

The present invention relates to a valve position adjustable lock mechanism consisting of an indicator ring and a stopper ring which are engageable with each other at a predetermined position whereby to restrict the rotation of a handle connected to the stem of a valve element whereby the valve element may be disposed at a predetermined position between a fully open to a fully closed position.

BACKGROUND ART

Known ball valves are controlled by a handle secured to a projection portion of a stem connected to the ball valve and extending exteriorly of the valve body. An abutment flange is secured to the valve handle and abuts a fixed projection which is mounted adjacent the handle portion. When the handle is turned and the flange abuts the stop element or stop post, the handle can no longer be rotated. Accordingly, if it is desired to have the ball valve displaced from a fully closed to a half open position, then it is necessary to position the handle where the ball valve is half-open and then to disconnect the flange which is usually secured by a nut threaded in the end of the stem extending through the handle and to position the flange against the stop post. The nut is then rethreaded so that the stop flange is fixed at an arresting position. Accordingly, when the arm is turned, the stop flange will arrest the handle at the half-open valve position.

A disadvantage of these types of stopper members is that they are time consuming to install, they are not precise and often become loose if the handle is forced to an open position and therefore no longer provide the satisfactory result that it was intended for.

SUMMARY OF INVENTION

It is a feature of the present invention to provide a valve position adjustable lock mechanism which substantially overcomes the above-mentioned disadvantages of the prior art.

Another feature of the present invention is to provide a valve position adjustable lock mechanism which is easy to install, easy to adjust, which is very precise and which may be readjusted in a very quick and efficient manner without the requirement of tools or special skills.

According to the above features, from a broad aspect, the present invention provides a valve position adjustable lock mechanism which comprises a valve element disposed in a valve port of the valve body for controlling the flow of a liquid through the valve body. A stem is secured to the valve element and extends exteriorly of the body. A handle is secured to the stem. An indicator ring is secured to the handle and has position indicias thereon to indicate the position of the valve element from a fully open to a fully closed position. Arresting means is provided to arrest the handle at the fully open and fully closed positions. A stopper ring is disposed over the indicator ring and displaceable for engagement and disengagement therewith through disconnectable engagement means. The stopper ring has abutment means for abutment with a fixed stop element secured to the valve body. The stopper ring has alignment means to position the abutment element at a desired location selected by the position of the alignment means relative to the position indicias.

BRIEF DESCRIPTION OF DRAWINGS

A preferred embodiment of the present invention will now be described with reference to the accompanying drawings in which:

FIG. 6 is a side view showing the stopper ring engaged with the indicator ring at a preselected position relative to the indicia markings;

FIG. 7 is a side view showing the valve in a selected open position with the stopper ring engaged with the indicator ring; and FIG. 8 is an end view of the valve showing the valve element partly open to a selected indicia position.

DESCRIPTION OF PREFERRED EMBODIMENTS

Figure 1A:
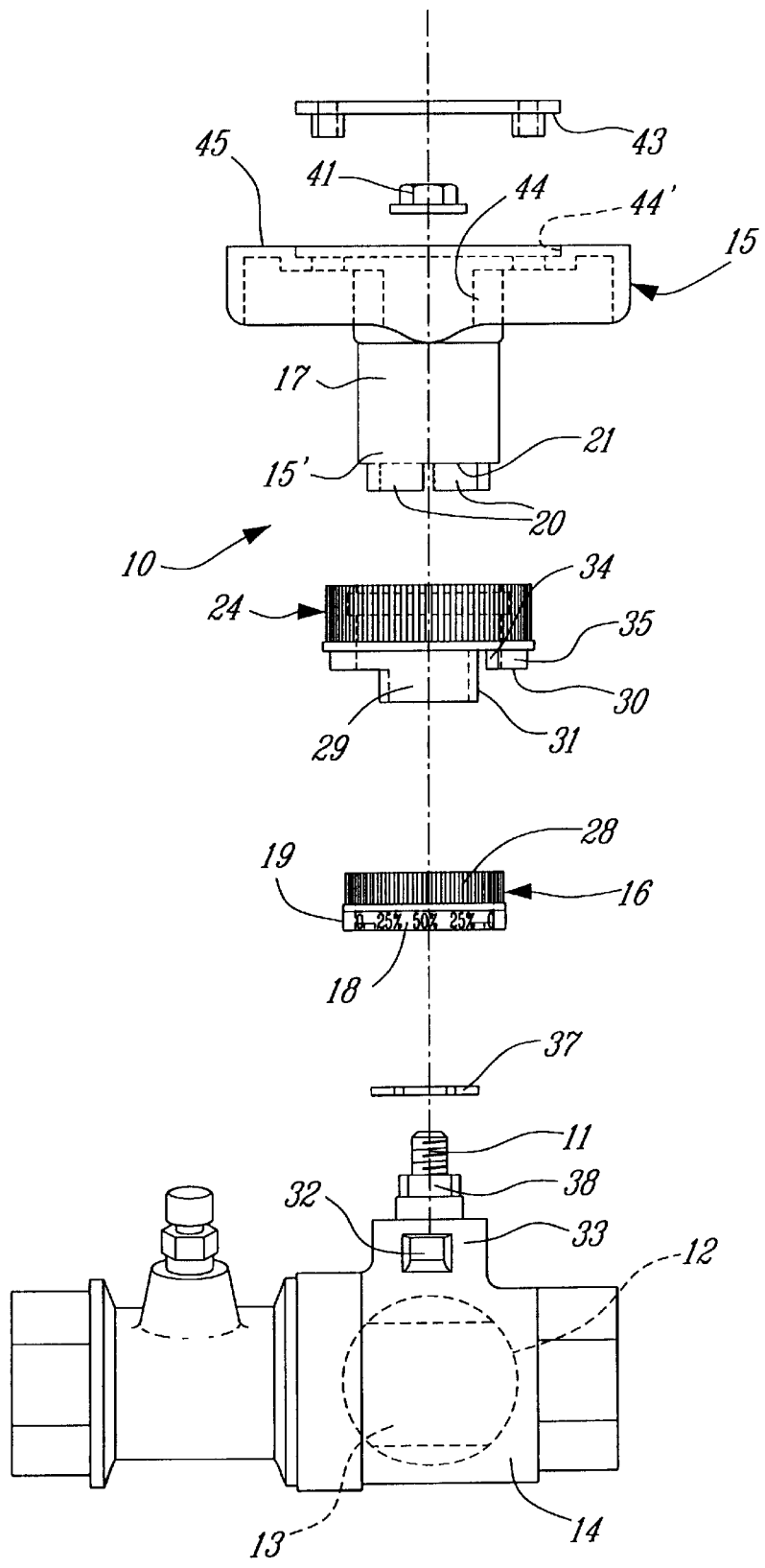
FIG. 1A is an exploded view of the valve position adjustable lock mechanism secured to the stem of a ball valve.
Figure 1B:
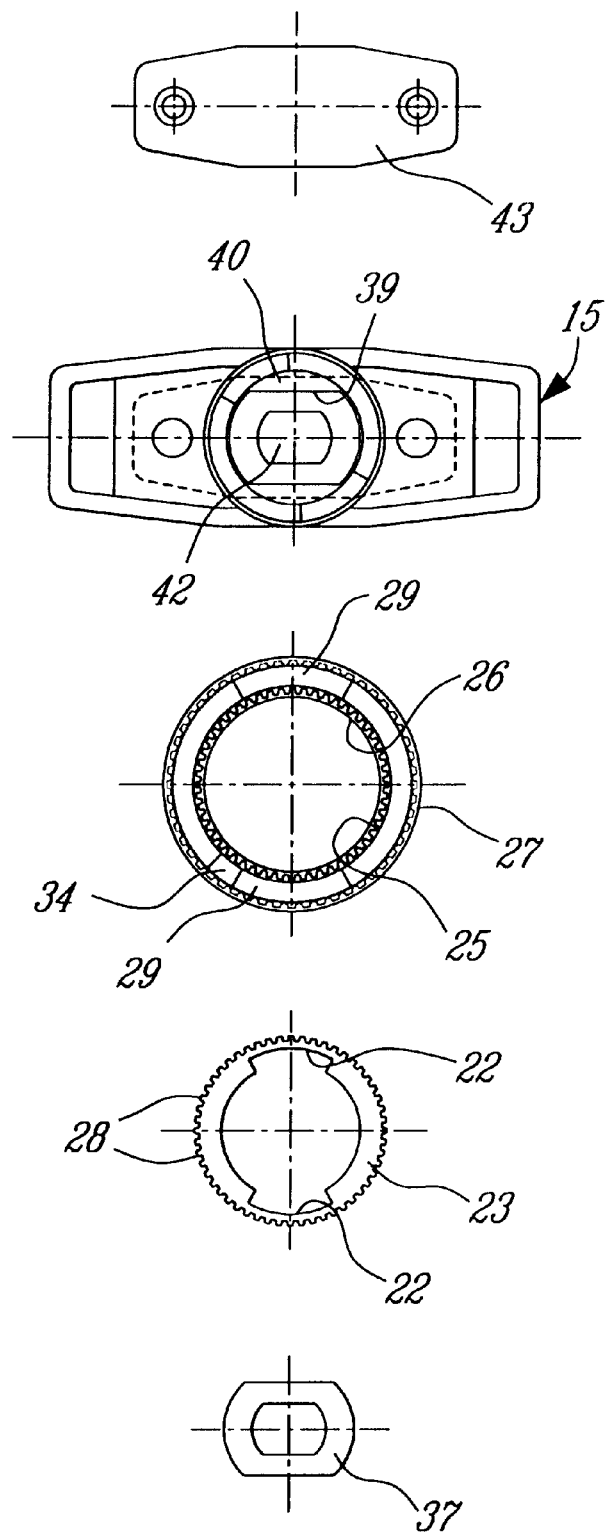
FIG. 1B is an exploded view showing the elements of the valve position adjustable lock mechanism but from a bottom or plan perspective.
Figure 2:
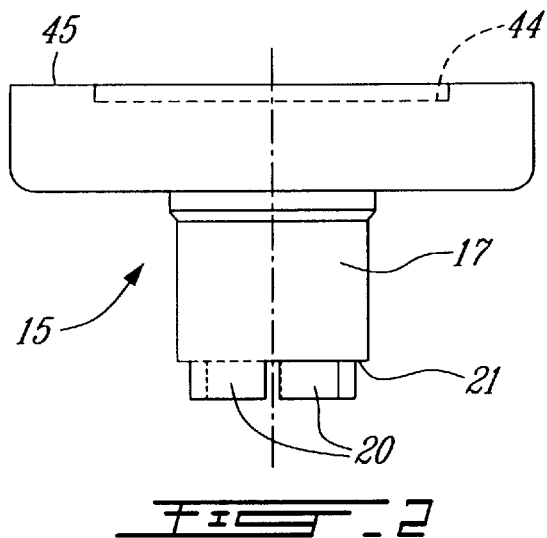
FIG. 2 is a side view showing the construction of the handle.
Figure 3A:
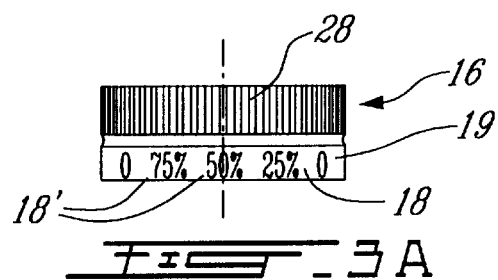
FIG. 3A is a side view showing the indicator ring and the indicias provided thereon.
Figure 3B:
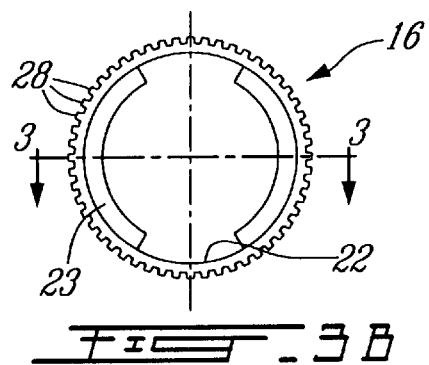
FIG. 3B is a bottom view of the indicator ring.
Figure 3C:
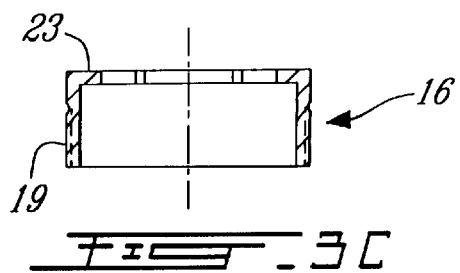
FIG. 3C is a cross-section view of the indicator ring along section lines 3—3 of FIG. 3B.
Figure 4A:
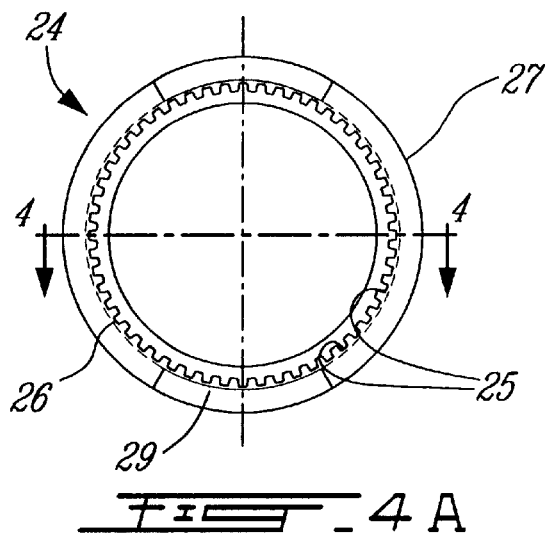
FIG. 4A is a bottom view of the stopper ring.
Figure 4B:
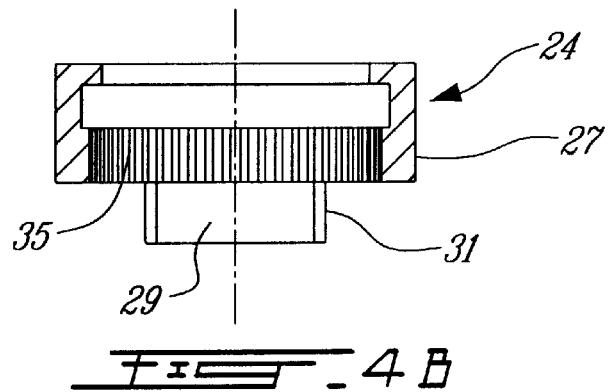
FIG. 4B is a section view along cross-section lines 4—4 of FIG. 4A.

Referring now to the drawings and more particularly to FIGS. 1A to 4B, there is shown, in an exploded form, and generally at 10, the adjustable lock mechanism which is secured to the stem 11 of a ball valve element 12 mounted in a valve port 13 in a valve body 14. The adjustable lock mechanism provides for the handle 15 to be rotatable from a fully closed to a preselected open position between the fully closed and fully open position of the ball valve element 12.

As hereinshown the adjustable lock mechanism comprises an indicator ring 16 which is securable to the lower portion 15' of the lower cylindrical stem 17 of the handle 15. The indicator ring 16 is provided with position indicias 18 about a portion of its lower circumference 19 to indicate the position of the valve element from its fully open to its fully closed position. The lower portion 15' of the handle 15 has a pair of projections 20 which depend from a lower edge 21 thereof and disposed at predetermined spaced locations corresponding to the fully open and fully closed positions of the valve element. These projections extend through corresponding slots 22 formed in a top circumferential wall 23 of the indicator ring 16 and depends therebelow as can be seen from FIG. 5 when the adjustable lock mechanism is mounted and immovably secured about the stem.

Figure 5:
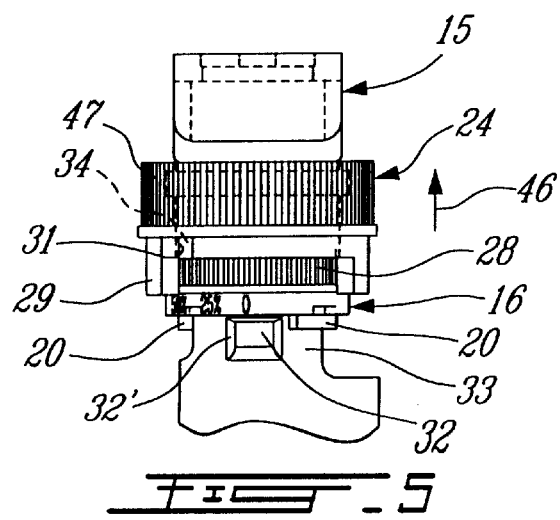
FIG. 5 is a side view showing the stopper ring in its disconnected position from the indicator ring.

A stopper ring 24 is disposed over the indicator ring and displaceable for engagement and disengagement therewith through disconnectable engagement means which is constituted by one or more projections, herein a plurality of ribs 25 disposed spaced-apart all about the inner surface 26 of the circumferential wall 27 of the stopper ring. These ribs 25 have a cross-section and an overall dimension to be received in sliding fit with a plurality of slots or splines 28 disposed all about the outer circumferential surface of a top portion of the indicator ring 16 (see FIG. 3A). The indicator ring 16 is secured about the lower portion 15' of the lower cylindrical stem 17 of the handle by glue and at a precise position, as determined by the slots 22 mating with the projections 20 and thus is immovably secured with the projections 20 extending therebelow, as shown in FIG. 5.

The stopper ring 24 is also provided with abutment means in the form of one or two opposed depending flange wall sections 29 which depend from the lower edge 30 and provided with an abutment edge 31 to abuttingly engage a stop element which is constituted by one or two opposed projecting fingers 32 which are formed integral or otherwise secured to the valve body 14 and specifically on a cylindrical stem housing 33 thereof. These projections 20 and projecting fingers 32 provide for the restricted, preselected displacement of the valve element from its closed position to a partly open position.

The stopper ring 24 is further provided with alignment means in the form of a window opening 34 (as better seen in FIGS. 5 to 7) formed in a lower flange wall 35 thereof whereby to selectively position the abutment edge 31 of the depending flange wall section 29 at a desired location selected by the position of the window opening 34 over a selected one of the position indicias 18. As shown more clearly in FIG. 3A, the position indicias 18 show a marking designating a fully closed position, by the letter "IC" to a fully open position designated by the letter "O". Percentage markings, 18', herein markings of 25%, 50% and 75%, indicate the valve openings. The number of splines 28 used provide for a 5% adjustment between the percentage markings 18'.

The handle 15 is secured to the stem 11 at a precise position which is determined by the washer 37 which is dimensioned to fit about the formation 38 formed in the bottom end of the stem 11 and within a locating cavity 39 formed within the inner base surface 40 of the lower cylindrical stem 17 of the handle 15. A nut 41 secures the projecting end of the stem 11 which extends through the through bore 42 formed within the bottom wall 40 of the handle in a top cavity 44 provided in the handle. The top cavity 44 is concealed by a cover plate 43 which is detachably secured within the outer edge 44' of the cavity 44 and formed in the top wall 45 of the handle.

With reference now to FIGS. 5 to 8 there will be described the operation of the adjustable lock mechanism of the present invention when secured to the stem of a ball valve. As shown in FIG. 5, when the valve is in its closed position, the indicia marking "C" is aligned with an edge 32' of the projecting finger 32. The stopper ring 24 is herein shown pulled upwardly in the direction of arrow 46 and is disconnected from the indicator ring 16. The outer surface of the stopper ring 24 may be ribbed or knurled as shown at 47 to provide non-slip finger engagement to facilitate movement of the stopper ring upwardly from the indicator ring and rotation thereof when not engaged with the indicator ring.

To preselect a desired valve opening, the stopper ring 24 is rotated until the window 34 is above a selected indicia marking. The stopper ring is then lowered in the direction of arrow 48, as shown in FIG. 6, onto the indicator ring 16 making sure that the ribs inside the circumference of the stopper ring have engaged in sliding fit with the splines 28 about the indicator ring 16. As shown in FIG. 6, the 25% valve opening has been selected and appears in the window 34. In this position, the depending flange wall 29 is at a preselected position and lowered for abutment against the edge 32' of the projecting finger 32 when the handle is rotated. By rotating the handle in the direction of arrow 49, as shown in FIG. 7, the abutment edge 31 of the depending flange wall 29 will arrestingly engage with the edge 32' of the projecting finger 32 and the handle can no longer be rotated. Accordingly, the ball valve will be arrested and provide a valve opening of 25% of its full capacity.

FIG. 8 is an end view of the ball valve showing the valve element 12 located in the valve port 13 and arrested to provide the 25% opening 50, as illustrated.

Those skilled in the art will appreciate that the conception upon which this disclosure is based may readily be utilized as a basis for the designing of other structures for carrying out the several purposes of the present invention. It is important, therefore, that the claims be regarded as including such equivalent constructions insofar as they do not depart from the spirit and scope of the present invention.

I claim:

1. A valve position adjustable lock mechanism comprising a valve element disposed in a valve port of a valve body for controlling the flow of a liquid through said valve body, a stem secured to said valve element and extending exteriorly of said body, a handle secured to said stem, an indicator ring secured to said handle and having position indicias thereon to indicate the position of said valve element from a fully open to a fully closed position, arresting means to arrest said handle at said fully open and fully closed positions, a stopper ring disposed over said indicator ring and displaceable for engagement and disengagement therewith through disconnectable engagement means, said stopper ring having abutment means for abutment with a fixed stop element secured to said valve body, said stopper ring having alignment means to position said abutment means at a desired location selected by the position of said alignment means relative to said position indicias, said disconnectable engagement means being provided by a plurality of vertical splines disposed about at least a portion of an outer circumferential surface of said indicator ring, and one or more projections formed in an inner surface of a circumferential wall of said stopper ring and adapted for sliding fit connection and disconnection with said splines when said stopper ring is displaced from a disconnected Position above said indicator ring to a selected connected position over said indicator ring.

2. A valve position adjustable lock mechanism as claimed in claim 1 wherein said abutment means is a depending flange wall depending from said stopper ring and having an abutment edge disposed for abutment with said fixed stop element to limit the rotation of said handle to a selected position determined by the position of said alignment means with respect to said position indicias.

3. A valve position adjustable lock mechanism as claimed in claim 2 wherein said position indicias are valve element position markings corresponding to specific positions of said valve element from said fully closed to said fully open positions.

4. A valve position adjustable lock mechanism as claimed in claim 3 wherein said alignment means is constituted by a window opening formed in a lower edge of said circumferential wall of said stopper ring.

5. A valve position adjustable lock mechanism as claimed in claim 2 herein said valve element is a ball valve element.

6. A valve position adjustable lock mechanism as claimed in claim 2 wherein said fixed stop element is a projecting finger formed integral with said valve body and projecting outwardly at a predetermined spacing below a lower edge of said indicator ring.

7. A valve position adjustable lock mechanism as claimed in claim 6, wherein there are two of said projecting fingers diametrically aligned with one another, there also being two depending flange walls each having said abutment edge disposed for abutment with a respective one of said two projecting fingers.

8. A valve position adjustable lock mechanism as claimed in claim 2 wherein said stopper ring has a circular bore in a top wall thereof and held captive about a lower cylindrical stem of said handle extending therethrough, said stopper ring being vertically displaceable about said lower circular stem from said connected position to said disconnected position.

9. A valve position adjustable lock mechanism as claimed in claim 8 wherein said indicator ring is secured to a lower edge portion of said lower cylindrical stem.

10. A valve position adjustable lock mechanism as claimed in claim 8 wherein said arresting means is constituted by a pair of projections depending from a lower edge of said lower cylindrical stem of said handle and disposed at predetermined spaced locations corresponding to said fully open and fully closed positions of said valve element, said pair of projections extending through corresponding slots formed in a top circumferential wall of said indicator ring and depending therebelow.

11. A valve position adjustable lock mechanism as claimed in claim 9 wherein said indicator ring is glued about said indicator ring in fixed position.

12. A valve position adjustable lock mechanism as claimed in claim 1 wherein said splines are disposed all about said outer circumferential surface of said indicator ring.

13. A valve position adjustable lock mechanism as claimed in claim 1 wherein said projections are ribs disposed spaced-apart all about said inner surface of said circumferential wall of said stopper ring, said ribs having a cross-section and overall dimension to be received in sliding fit with said splines.

* * * * *